(12) United States Patent
Fox et al.

(10) Patent No.: US 7,693,623 B2
(45) Date of Patent: Apr. 6, 2010

(54) RAILROAD SNOW REMOVAL SYSTEM

(75) Inventors: David K. Fox, Wayzata, MN (US);
Greggory C. Phelps, Plymouth, MN (US); Randall G. Honeck, Maple Grove, MN (US); Albert Newton, Brooklyn Park, MN (US)

(73) Assignee: Railway Equipment Company, Inc., Plymouth, MN (US)

( * ) Notice: Subject to any disclaimer, the term of this patent is extended or adjusted under 35 U.S.C. 154(b) by 337 days.

(21) Appl. No.: 11/700,545

(22) Filed: Jan. 31, 2007

(65) Prior Publication Data

US 2007/0193072 A1    Aug. 23, 2007

Related U.S. Application Data

(60) Provisional application No. 60/763,713, filed on Jan. 31, 2006, provisional application No. 60/844,866, filed on Sep. 15, 2006.

(51) Int. Cl.
*G05D 1/00* (2006.01)
(52) U.S. Cl. .............................. 701/19; 701/20; 701/36; 37/198; 37/199
(58) Field of Classification Search .................. 701/19, 701/20, 32, 36; 246/1 R, 428; 37/198, 199, 37/200; 104/279
See application file for complete search history.

(56) References Cited

U.S. PATENT DOCUMENTS

| | | | |
|---|---|---|---|
| 4,081,161 A | 3/1978 | Upright | |
| 4,195,805 A | 4/1980 | Keep, Jr. | |
| 4,391,425 A | 7/1983 | Keep, Jr. | |
| 5,004,190 A * | 4/1991 | Montierth et al. | 246/428 |
| 5,345,223 A | 9/1994 | Rutkiewicz | |
| 5,824,997 A | 10/1998 | Reichle et al. | |
| 6,065,721 A | 5/2000 | Sumpton et al. | |
| 6,714,134 B2 | 3/2004 | Addink et al. | |
| 6,727,470 B2 | 4/2004 | Reichle | |
| 6,995,666 B1 | 2/2006 | Luttrell | |

OTHER PUBLICATIONS

International Search Report and Writen Opinion mailed Dec. 14, 2007.

* cited by examiner

*Primary Examiner*—Gertrude Arthur Jeanglaud
(74) *Attorney, Agent, or Firm*—Merchant & Gould P.C.

(57) ABSTRACT

A snow removal system wherein snow removers located in remote locations can be monitored and controlled at a computing device. Data collected by sensors on the snow removal unit or data collected from a secondary source can be used to control the operation of the snow removers. In one embodiment, data regarding whether it is snowing at a particular location can be collected by moister sensors on the snow removal device and verified by on-line contemporaneous weather reports corresponding to the same location.

24 Claims, 15 Drawing Sheets

SNO-NET™ Demonstration

SNO-NET™ by Railway Equipment Co. | Snow Melter LOC200 | Log Out

Site Details : East Wayzata

| Region | North |
| --- | --- |
| Division | Twin Cities |
| Subdivision | 100 |
| Mile Post | 200 |
| Zip Code | 55112 |

Called For By
- ○ None
- ○ Dispatcher
- ○ Snow Detector
- ○ Local Switch
- ○ Internet User
- ● Weather Watcher™

Machine Status
- ○ Idle
- ○ Running - OK
- ● Not Running - Air Temp
- ○ Not Running - Faulted
- ○ Not Running - Timed Out
- ○ Not Running - Should Be - Weather
- ○ Running - Should Not Be - Weather
- ○ Communication Failure

Current Site Status

Current weather conditions for Saint Paul, MN
Fair
76° F
SE 8mph

Updated: Thu, 15 Jun 2006 12:33 pm CDT

View Satellite Image of Site

---

Current Status | Last Fault Reading | History | Controls

| Data | Value | Low | High |
| --- | --- | --- | --- |
| Ambient Temperature | 63.7°F | | |
| Rail Temperature | 64.5°F | | |
| Motor Voltage | 0.0V | 208V | 250V |
| Flame Current | 0.0µA | 3µA | 15µA |
| Duct Pressure | 0.0"w.c. | 1"w.c. | 4"w.c. |
| Gas Pressure | 0.0"w.c. | 7"w.c. | 12"w.c. |
| Total Gas Used | 0gal | | |
| Resetable Gas Used | 0gal | | |
| Motor Current | 0.0A | 2A | 12A |

| Data | | | |
| --- | --- | --- | --- |
| Total Hours | | | |
| Resetable Hours | | | |
| Tank Level | | | |
| Air Temperature Setpoint | | | |
| Rail Temperature Setpoint | | | |
| Burner Operation | | | |
| Gas Type | | | |
| Moisture Sensitivity | | | |
| Indication Select Value | | | |
| Firmware Level | | | |
| Tank Size | | | |
| Run Time | | | |
| Snow Time | | | |
| Run Time Setpoint | | | |
| Snow Time Setpoint | | | |

Has been running for 12 minutes

---

Reading 2006-05-18 01:34:10 PM

| Data | Value | Low | High |
| --- | --- | --- | --- |
| Fault Count Motor Overload | 0 | 0 | 0 |
| Fault Count Sail Switch On | 0 | 0 | 0 |
| Fault Count Sail Switch Off | 0 | 0 | 0 |
| Fault Count Flame Sense On | 0 | 0 | 0 |
| Fault Count Flame Sense Off | 0 | 0 | 0 |
| Fault Count Leaky Gas | 0 | 0 | 0 |
| Fault Count Motor Voltage Low | 0 | 0 | 0 |
| Fault Count Gas Pressure Low | 0 | 0 | 0 |
| Fault Count Duct Pressure Low | 0 | 0 | 0 |
| Fault Count Duct Pressure High | 0 | 0 | 0 |
| Count CPU Restarts | 133 | | |
| Fault Count Communication Loss | 0 | 0 | 0 |
| Motor Type | 0 | 0 | 0 |

FIG. 11

SNO-NET™ Demonstration

SNO-NET™ Demonstration

FIG. 13

SNO-NET™ Demonstration

SNO-NET™ by Railway Equipment Co.    Snow Melter Locator | Administration | Log Out    Site Commissioning Site Administration - East Wayzata

Details | Users | Notifications

Serial Number: 1001
Name: East Wayzata
Zip Code: 55122
Latitude: 55.555
Longitude: 67.9244234

Region: North
Division: Twin Cities
Subdivision: 100
Mile Post: 200

Save Changes    * Required field

RAILROAD SNOW REMOVAL SYSTEM

CROSS REFERENCE TO RELATED APPLICATIONS

This application claims the benefit of U.S. Provisional Patent Applications Ser. No. 60/763,713, filed Jan. 31, 2006, and Ser. No. 60/844,866, filed Sep. 15, 2006. The above applications are incorporated herein by reference in their entirety.

TECHNICAL FIELD

This invention relates to railroad snow removal systems. More particularly, the present invention relates to a monitoring and control system for a network of snow removal devices.

BACKGROUND OF THE INVENTION

During the winter it is not uncommon for snow and ice to accumulate on and around railroad tracks. To maintain optimal track performance it is desirable to keep certain areas of the track free of snow and ice year round. For example, it is particularly desirable to keep the areas where tracks cross each other (frogs) and where tracks merge or split (switches) free of snow and ice. Though the system of the present disclosure will be described herein primarily with reference to railroad track switches, the description is not meant to be limiting. It should be appreciated that the system is applicable to other applications as well.

Railroad track switches are used to divert a train from one train track to another train track. The railroad switches typically include a pair of rails that move from a first position to a second position. The switches typically include moving parts that are exposed to the environment. Snow and ice build-up on the switch can cause the switch to malfunction.

A number of different types of railroad track switch snow removers are known. See, for example, U.S. Pat. No. 5,824,997 to Reichle et al.; U.S. Pat. No. 4,391,425 to Keep, Jr.; and U.S. Pat. No. 4,081,161 to Upright. The railroad track switch snow remover often includes a blower that blows heated air or ambient air across the switch. Though some heaters and blowers of the snow removing devices are electric powered, most are gas powered, as they are typically located in remote locations. Sometimes the snow removers include temperature and moisture sensors so that an operator at a remote location can determine when to turn the devices on or off. Some devices are programmed to automatically turn themselves on or off depending on the reading from the sensors.

A problem with the existing systems is that malfunctioning device can be difficult to identify. In some cases, the devices are turned on when it is not snowing or turned off when it is snowing. In the first case, fuel is wasted, and in the second, the switch may malfunction due to undesirable snow accumulation in the tracks. Moreover, existing switch snow removal control systems are not configured to collect, store, and/or report data regarding performance and other conditions of the device. A system that can be used to effectively monitor and control snow removal devices located in remote locations is desirable.

SUMMARY OF THE INVENTION

The present invention relates to a system for controlling and monitoring snow removal devices. According to one embodiment, the snow removal devices include sensors for measuring data, and a processor remotely transmits the measured data to a base station. In some embodiments the measured data is environmental data that can be accessed by an operator remotely on a handheld device or at a computer terminal operably connected to the snow removal devices. In such an embodiment, the operator can monitor the device and choose to override the automated operation of the snow removal devices.

According to another embodiment, the geographic location of each snow removal device is stored in a memory location on the device or at the base station, and the base station is configured to query the weather conditions at the stored geographic location.

In one embodiment, the measured data is compared with the queried data. If the measured data is within a certain predetermined acceptable range compared to the queried weather data, the snow removal device is characterized as being operational. However, if the sensor reading is outside of a predetermined range the operator is alerted. In an alternative embodiment the query data is processed to determine whether the snow removal device that corresponds with the particular geographic location should be on or off. The base station then determines whether the snow removal device is in fact on or off. If there is a discrepancy, the base station automatically notifies an operator.

In another embodiment the queried and measured data relate to the operational conditions of the device rather than environmental conditions. For example, the data may relate to the amount of fuel consumed by the device or amount of fuel remaining in the device. The measured data can be compared with data stored on a database that can be accessed by the base station. If a discrepancy is detected, the operator is alerted.

According to another embodiment the user can monitor and control the device via a computer or a handheld wireless computing device. The data is represented graphically to the operator via icons on a map, and the devices can be controlled by the user remotely.

A variety of additional inventive aspects will be set forth in the description that follows. The inventive aspects can relate to an individual feature or to a combination of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 8 is a screen shot that displays a summary of the operating conditions of related snow melters according to an embodiment of the invention;

FIG. 9 is a screen shot that displays the detailed operating conditions of a selected snow melter according to an embodiment of the invention;

FIG. 11 is a screen shot that displays user rights to snow melters according to an embodiment of the invention;

FIG. 13 is a screen shot that displays the location and identification of snow melters according to an embodiment of the invention;

DETAILED DESCRIPTION OF THE PREFERRED EMBODIMENT

Figure 1:
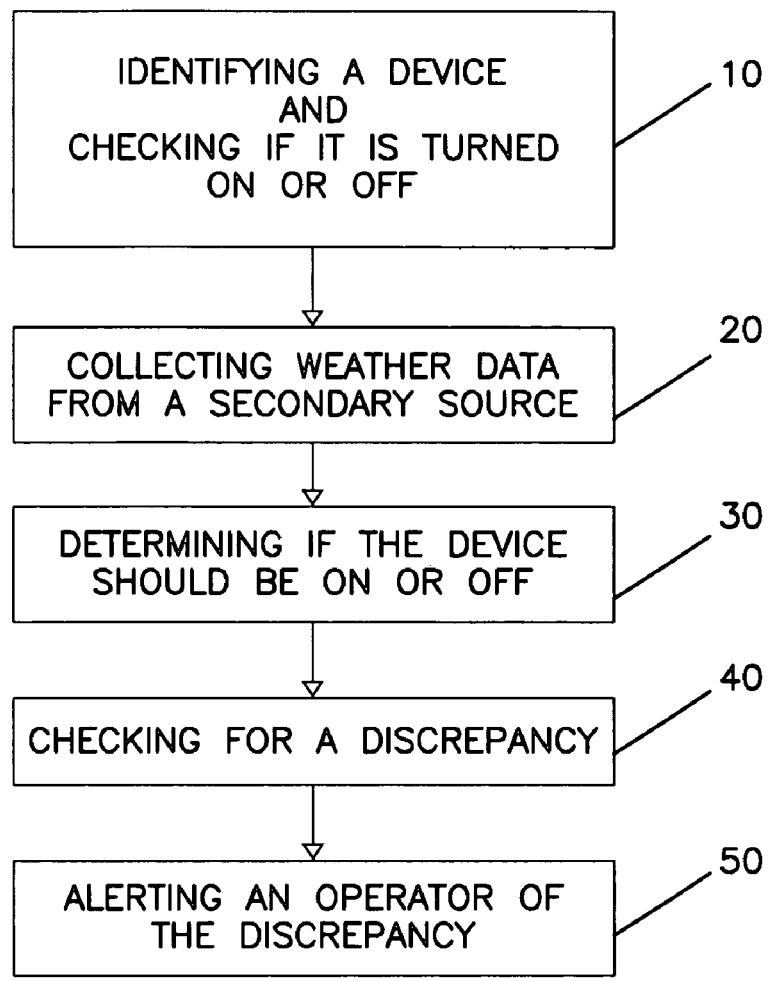
FIG. 1 is a flow chart of a method of monitoring and controlling railroad switch snow removal devices in accordance with an embodiment of the invention.
Figure 3:
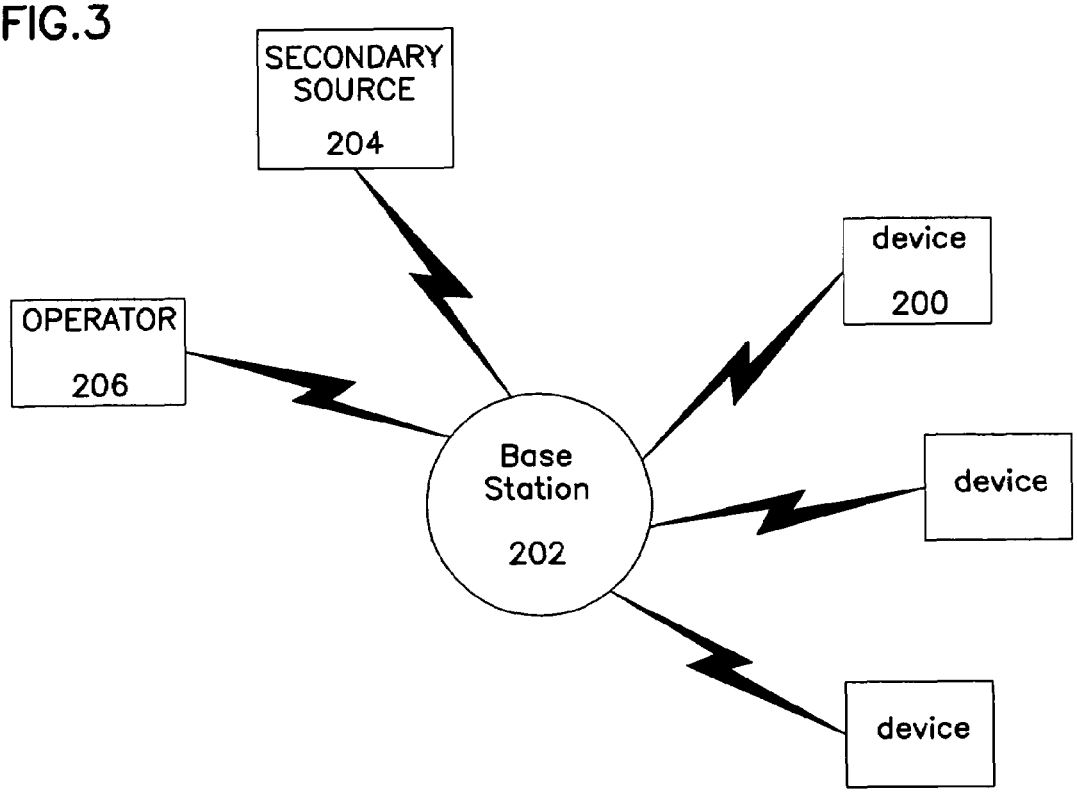
FIG. 3 depicts the network including a plurality of railroad switch snow removal devices according to an embodiment of the invention.

Referring primarily to FIGS. 1 and 3, a method of monitoring railroad switch snow removal devices 200 is shown. The first step includes identifying 10 a device and checking if the device 200 (shown schematically in FIG. 4) is on or off. In some embodiments the geographic location is stored at the base station 202 corresponding to a particular device identification number. In another embodiment the geographic location is stored at a memory location 301 at snow removal device 200. The geographic location can be any number of references. In some embodiments, the geographic location is identified as specific geographic coordinates (e.g., longitude and latitude), while in other embodiments the geographic location is identified as a particular zip code. For example, referring to FIG. 13, the snow melter is shown associated with a serial number, name, zip code, latitude, longitude, region, division, subdivision, and mile post. In some embodiments the above information is recorded and tracked by a provider upon installation of the snow removal devices. Next, the base station 202 collects 20 weather data from a secondary source 204 that corresponds to the particular identified geographic location. Some exemplary secondary sources for weather data include: www.weather.com, www.cnn.com/weather/, and www.wunderground.com. Once the weather data is queried, the base station 202 determines 30 whether the device 200 should be on or off and checks 40 for any discrepancy. For example, if the secondary source indicates heavy snow at the particular geographic location, then the device should be on. In contrast, if the secondary source indicates that it is warm and sunny at the particular geographic location, the device should probably be turned off. If a discrepancy is detected, an operator 206 is alerted 50 so that the operator can investigate the discrepancy.

Figure 2:
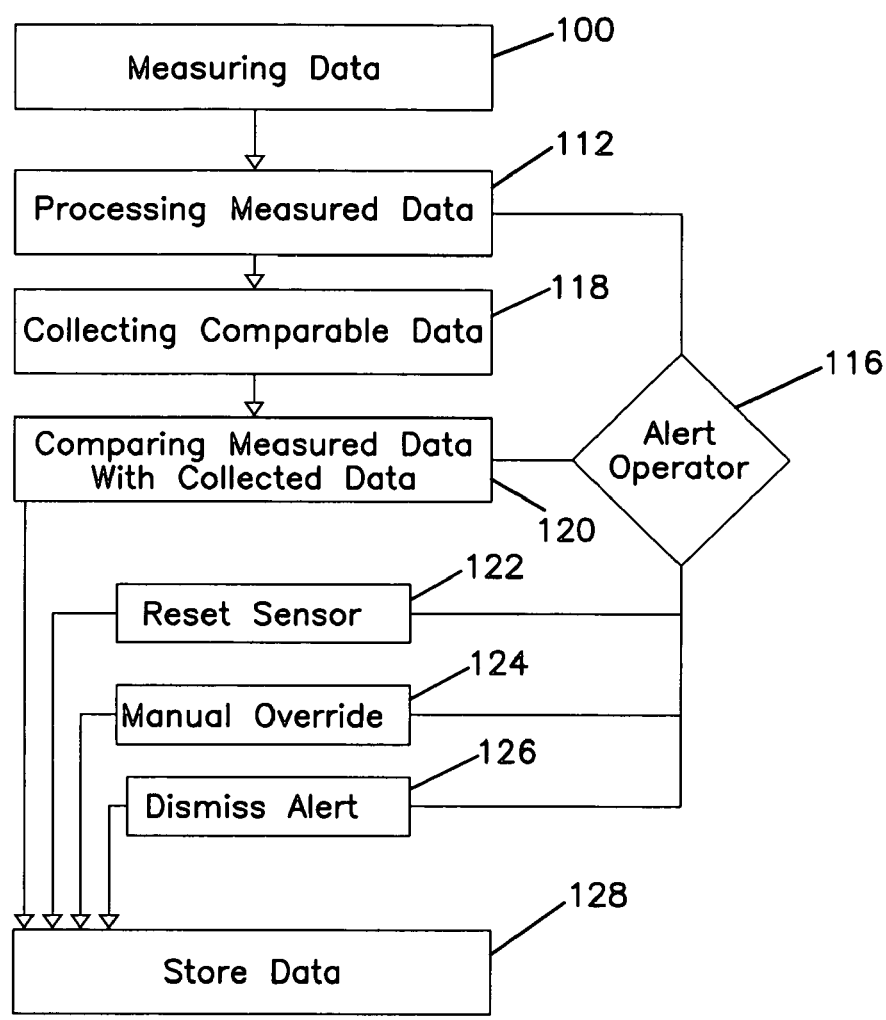
FIG. 2 is a flow chart of an alternative method of monitoring and controlling railroad switch snow removal devices in accordance with an embodiment of the invention.
Figure 4:
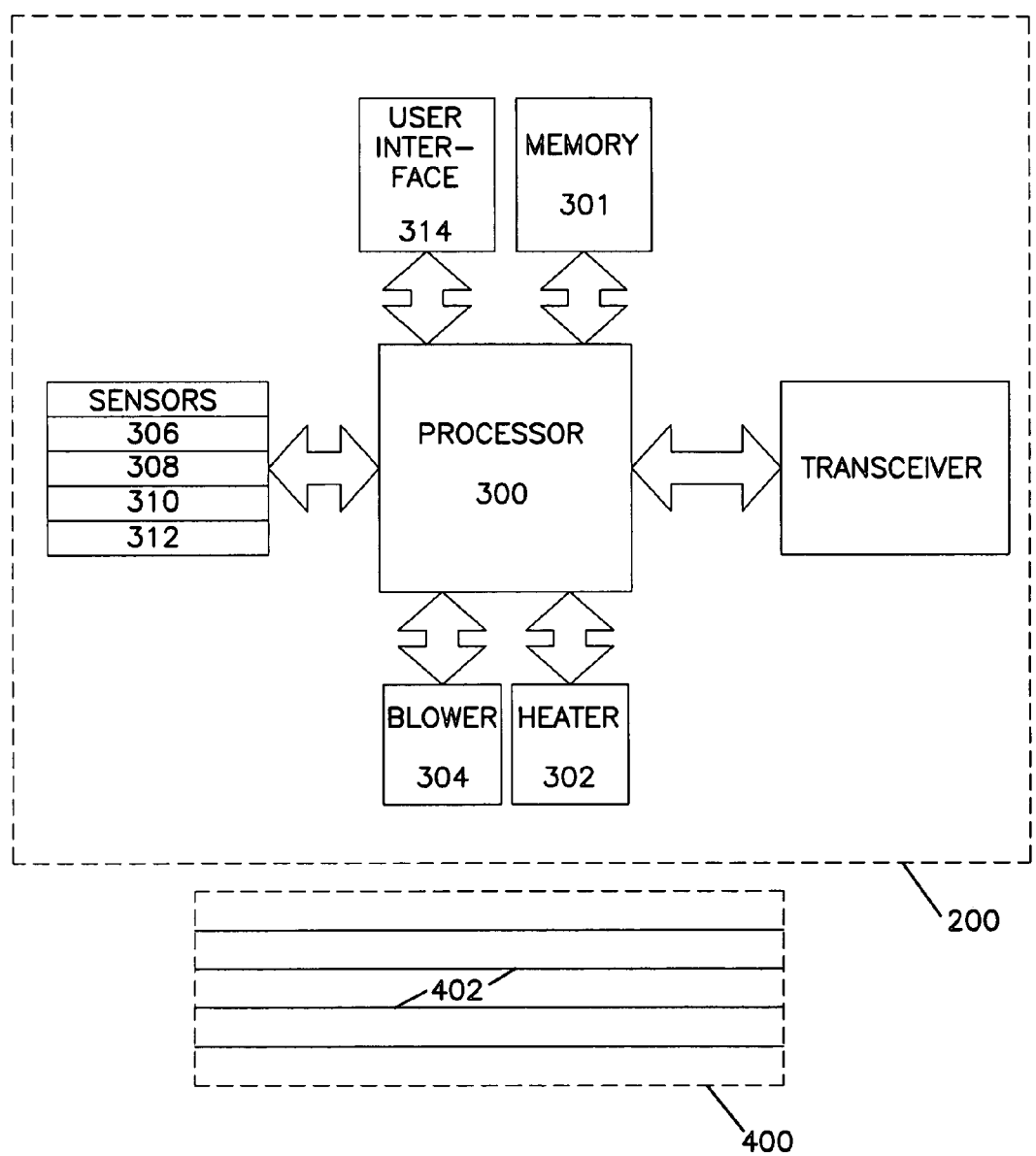
FIG. 4 is a schematic block diagram of a snow removal control unit according to an embodiment of the invention.

Referring to FIGS. 2 and 4, an alternative method of monitoring and controlling railroad switch snow removal devices 200 is shown. The first step includes measuring 100 operating and environmental conditions. This step, for example, may include the step of measuring the ambient temperature, the ambient moisture content, and the available fuel. The next step is processing the data 112 by comparing 120 the measured data to a predetermined set of criteria. This step can include comparing the data with a predetermined set of criteria saved in a local memory location 301 to determine if snow is falling and if the device has enough fuel to run properly. In some embodiments this step is accomplished locally by the processor 300 that is located at the snow removal device 200. In some embodiments, depending on the rate of snowfall, the ambient temperature, and the available fuel, the snow removal device 200 may automatically turn on or off as appropriate to ensure that snow and ice do not accumulate on the rails 402 of the switch 400. In some embodiments the temperature of the heating or lack thereof is determined based on the measured criteria. For example, if the snow is determined to be dry and light, the heater 302 of the snow removal device 200 may be left off to conserve fuel and only the blower 304 will be turned on.

Referring primarily to FIGS. 2, 3 and 4, in some embodiments if the measured values are outside of a predetermined set of values an alert is transmitted 116 to the base station 202. In some embodiments the base station 202 is configured to translate the received signal and determine, for example, whether a particular sensor 306, 308, 310, 312 has malfunctioned or if the device is out of fuel. When an alert is sent, an operator 206 can view the alert remotely when connected to the base station 202. In some embodiments the base station 202 is configured to page the operator 206 whenever a certain type of alert is received. For example, the base station 202 may be programmed to page the operator 206 when a snow removal device 200 has run out of fuel and snow is falling at that particular location. Such an alert enables an operator 206 to anticipate the failure of the particular switch 400 and make alternative arrangements as necessary.

Still referring primarily to FIGS. 2, 3 and 4, in the depicted embodiment the base station 202 measures 100 data from the snow removal devices 200 according to a maintenance check schedule. In some embodiments the collection of data is accomplished by configuring the snow removal devices 200 to periodically or continuously transmit measured data back to the base station 202. In other embodiments, the base station 202 is configured to query data from the snow removal devices 200 at certain times or on command. The base station 202 also collects 118 a comparable set of data from a secondary source 204. It should be appreciated that the step of collecting data from a secondary source can occur before, after, or simultaneously with the step of collecting data from the devices 200. The secondary source 204 in some embodiments includes real time weather information. In other embodiments the secondary source includes maintenance records, such as the last time the snow removal devices 200 were refueled. Subsequently, the data collected from the snow removal devices 200 is compared with the data collected from the secondary sources 204. If the datum from the snow removal devices 200 and the secondary sources 204 are outside of an acceptable range, an alert is triggered at the base station.

An alert may indicate, for example, that the snow removal device 200 is apparently low on fuel, even though the secondary source 204 maintenance records indicate that the snow removal device 200 was recently refueled. Once alerted to the discrepancy, the operator can investigate the issue further to determine if the snow removal device 200 is leaking, if the secondary source 204 maintenance records are inaccurate, or if the fuel sensor is inaccurate. If the operator 206 decides that the measured value is inaccurate, the operator 206 can reset (e.g., recalibrate) 122 the sensor or otherwise dismiss 126 the alert. In some embodiments the recalibration can be accomplished remotely, and in other embodiments the recalibration is accomplished via the user interface 314 located locally on the snow removal device 200. In such embodiments the device 200 includes a receiver in addition to the transmitter 612.

Alternatively, an alert may indicate, for example, that the measured temperature is substantially different than the temperature collected from the secondary weather data source that corresponds to the particular geographic location, which is measured and stored in a memory location. Once alerted of the discrepancy, the operator 206 may choose to override 124 the automatic on off control of the snow removal device 200 if appropriate, or otherwise dismiss 126 the alert. In such embodiments the device 200 includes a receiver in addition to the transmitter 612. An operator 206 can check other nearby sensors or other secondary sources to determine whether the measured data or the queried data is more likely accurate.

Finally, the base station 202 can be configured to store 128 all the dates and times that the measured data from each snow removal device 200 was checked against data from a secondary source 204. In some embodiments the next date and time that the measured data from that particular snow removal device 200 is check against data from a secondary source 204 is dependent on when the last check occurred and the outcome of the last check. In some embodiments, a number of different types of measured data is stored at the base station for maintenance purposes.

Figure 5:
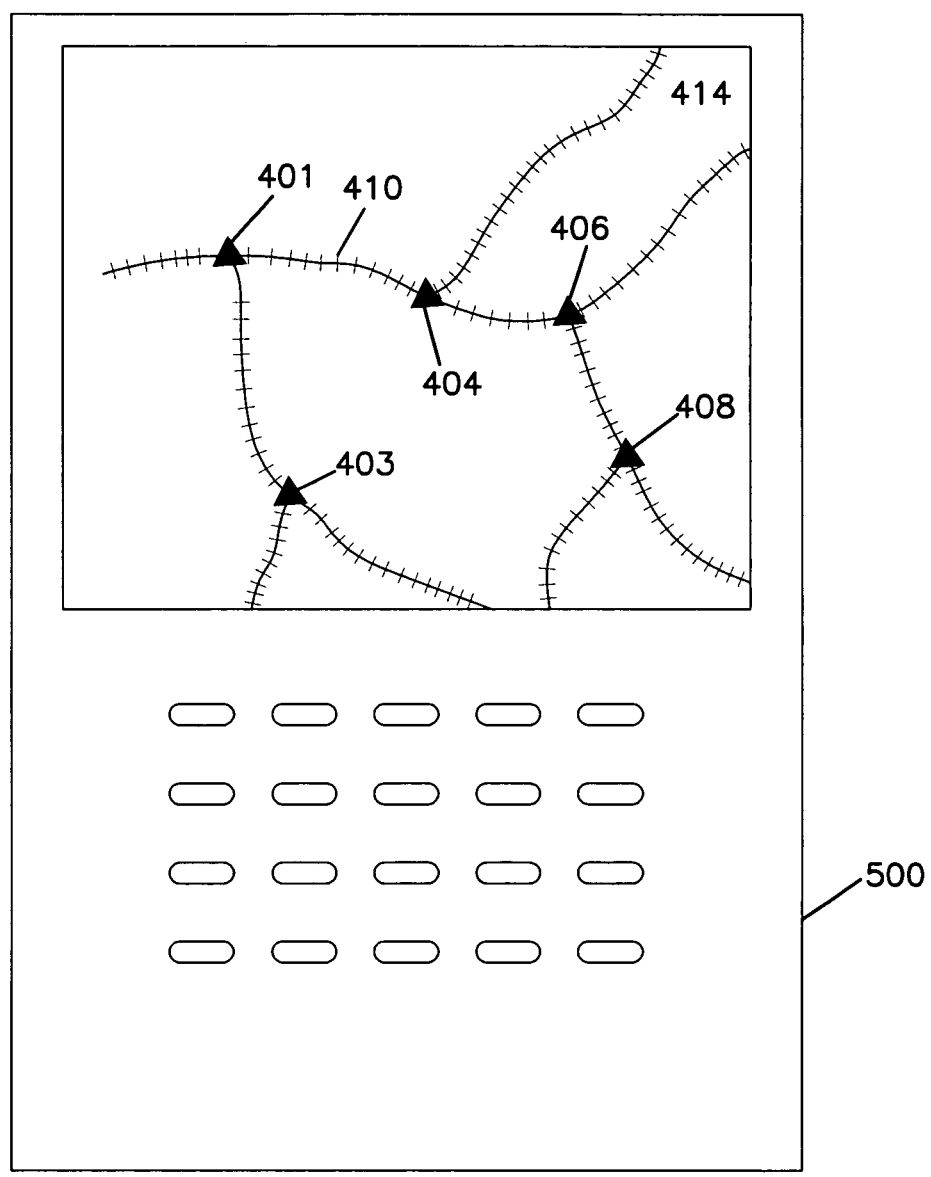
FIG. 5 depicts a user interface according to an embodiment of the invention.

Referring primarily to FIG. 5, according to one embodiment of the invention the data transmitted and processed at the base station can be accessed via an internet webpage. The data can in some embodiments be graphically represented via icons 401, 403, 404, 406, and 408 along tracks 410 on a map displayed on a computer screen 414. The user can check the operational parameters and the measured data by clicking on the icon that corresponds with the snow removal device 200 of interest. In some embodiments an alert is indicated on the map by a flashing icon or an icon that turns a particular color, such as orange or red. In other embodiments, the color of the icon 401, 403, 404, 406, and 408 corresponds with whether the particular corresponding snow removal device 200 is on or off or is full or low on fuel.

According to some embodiments the data can be accessed by the operator 206 wirelessly on a handheld device 500. In such an embodiment the operator can be in transit to service a particular snow removal device 200 and access real time data regarding the snow removal devices 200 in the field.

Figure 6:
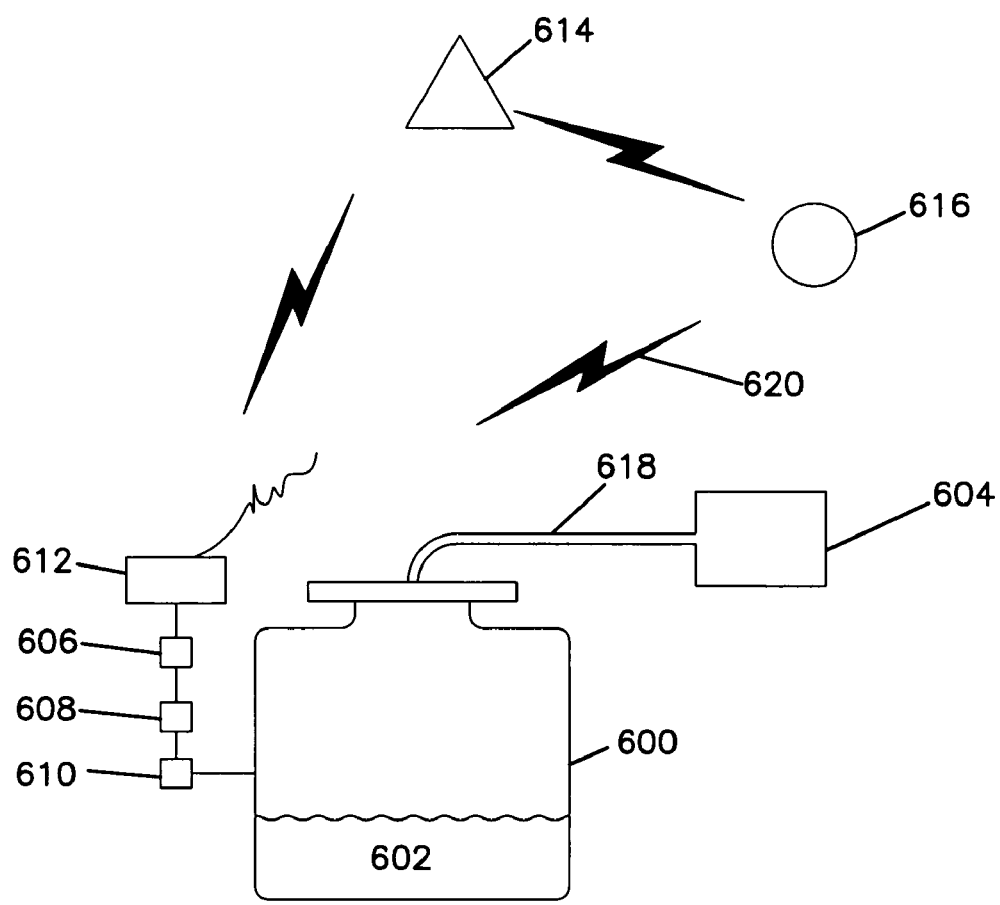
FIG. 6 is a schematic illustration of a fuel tank monitoring system according to one embodiment of the invention.

Referring to FIG. 6, an embodiment is shown where fuel tank related data is measured to determine if the tank 600 is expected to be operational. To be operational the tank 600 must be able to supply fuel to the burner 604. In the depicted embodiment the supplied fuel 618 is in gas form (e.g., propane or natural gas). To enable larger amounts of fuel 602 to be stored within the tank 600, the fuel 602 in the depicted embodiment is pressurized so that most of the fuel 602 in the tank 600 is in liquid form. Fuel must change phase from liquid to gas to be effectively used. Accordingly, the mere fact that the tank 600 is not empty does not necessarily mean that the tank 600 is expected to be operational. Since whether a particular liquid will change into a gas is dependent on the temperature of the liquid and the pressure in the tank 600, the temperature of the fuel 602 within the tank 600 and the pressure within the tank 600 factor into whether the tank 600 is operational (the colder a liquid is, the less likely the liquid will vaporize at a given pressure). In view of the above, as compared to only knowing the amount of fuel 602 in the tank 600, also knowing the temperature of the fuel 602, and the pressure within the tank 600 enables one to more accurately predict whether the tank 600 is operational.

According to one embodiment, to accurately estimate whether the tank 600 will be operational under certain conditions, preferably at least the following types of data are measured: the temperature in the tank 600 or the fuel 602 therein, the pressure within the tank 600, and the level of liquid fuel within the tank 600. Accordingly, to such an embodiment the system includes a temperature sensor 606, a pressure sensor 608, and a fuel level sensor 610. It should, however, be appreciated that in alternative embodiments sensors measuring different data may be included. It should also be appreciated that alternative embodiments may include more or fewer sensors in part depending on the specific methodology used to analyze the data, which will be discussed in greater detail below. It should be appreciated that in alternative embodiments an electric heat non-combustion source may be employed (e.g., electric calrod heater). Such systems could include a system for measuring whether the necessary electric energy exists, similar to the fuel tank monitoring system described above.

In the depicted embodiment the sensors are connected to a transmitter 612 that is configured to transmit the measured data to a remote base station 614 or a network server 616 or both. In one embodiment the base station 614 uses equations to calculate whether or not the tank 600 is expected to be operational based on the measured data and known or inputted data. In other embodiments the base station 614 relies on empirical data to make its determination regarding the operability of the tank 600. In yet other embodiments, a combination of empirical charts and equations are used in the analysis. In embodiments where empirical data is used in the analysis, the empirical data may be stored locally on a remote database and accessible via a network. In the depicted embodiment the empirical data is stored on a remote server 616 and accessible via the internet 620. Base station 614 can be connected to the transmitter 612 via the cellular telephone network directly, or via a short range wireless communication system such as any of a variety of 802.11 wireless networks (e.g., Wi-MAX or Wi-Fi) or any radio or other wireless or wire communication systems.

In some embodiments the base station 614 tracks and stores the measured data to analyze the fuel usage history. For example, in some embodiments the level of fuel in the tank 600 is tracked over a set period of time. Such tracking can be used for many purposes including, for example, determining whether the measured data is likely accurate or inaccurate, or whether the sensors are operable and/or whether the tank 600 is leaking. For example, if the tracked history indicates that the tank 600 was initially full and has been in use for a very short period of time or no time at all but is now empty, the tank 600 may be leaking or the measured data may be inaccurate. In some embodiments the base station 614 is configured to alert the operator when a potential problem is detected.

The system disclosed in FIG. 6, may also be used by an operator in determining the type of fuel that should be used for a particular application. In some embodiments the conditions, such as the expected ambient temperatures, may make a certain type of fuel preferable. The effectiveness and efficiency of particular fuels can be analyzed at the base station 614 based on the data collected by the sensors 606, 608, and 610. It should be appreciated that many other analyses can be conducted based on data measured by the sensors and/or data queried from a local or remote server 616.

Figure 7:
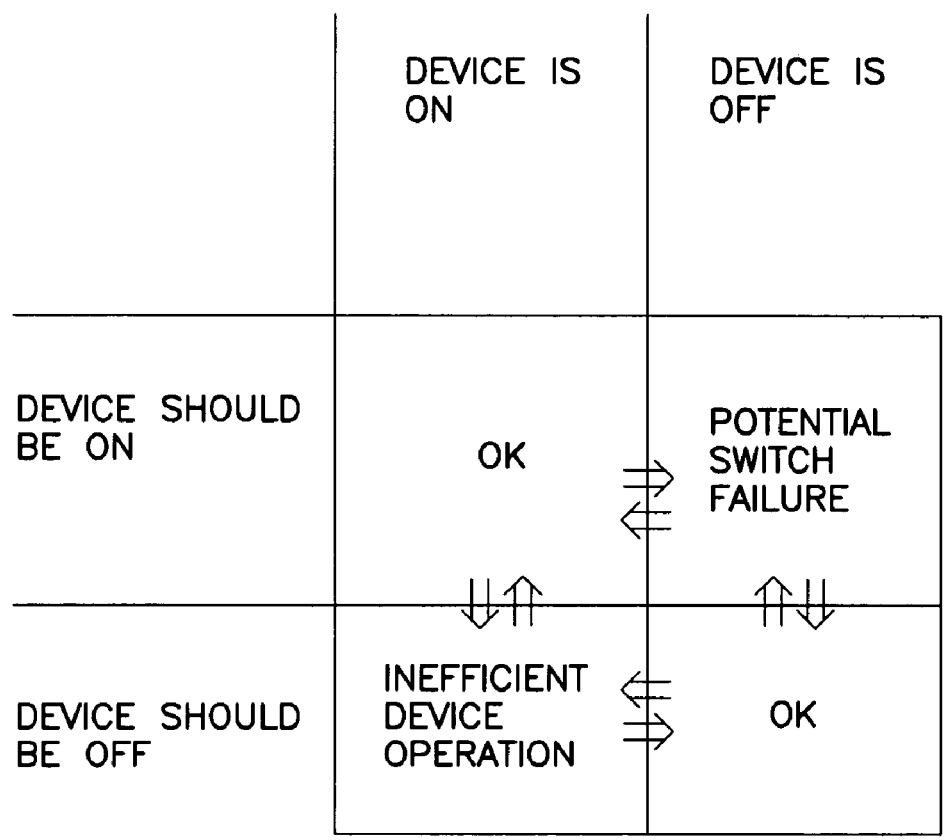
FIG. 7 is a schematic illustration of several possible scenarios that are used to describe the operations of the invention.

Referring to FIG. 7, the process of determining when it is appropriate to alert the operator of a failure or otherwise initiate the process of override, the operations of a failed device is illustrated. It is desirable to avoid false detection of device failures, which are the results of normal error. For example, for a period of time the device might be ON while it is snowing. During this period the operation of the system may be characterized by the upper left quadrant (i.e., the device is ON and the device should be ON). The snow might stop, but for a relatively short period of time the device might still be ON. During this period the operation of the system can be characterized as having moved to the lower left quadrant (i.e., the device is ON and the device should be OFF). During this time period, fuel is being wasted. This might occur because the sensors on the device, or the empirical data, or both, are slightly off. To avoid alerting the operator relating to small discrepancies which in time correct themselves, the system can be set up such that the system must operate in the lower left state for more than an hour before an alert is sent to the operator or a failure is otherwise deemed. On the other hand, the system be might be operating in the upper left quadrant and move to the upper right quadrant. This would occur if snow continue to fall, but the device turns itself off (i.e., the device is OFF and the device should be ON). Since it is important to prevent railroad switch failure, the system might be set to alert an operator or otherwise consider the discrepancy a failure after a relatively shorter period of time, for example, 10 minutes instead of an hour.

Still referring to FIG. 7, as discussed above the time period for acceptable discrepancies is dependent on the type of discrepancy (i.e., if the device is ON when it should be off versus the device is off when it should be on). Another factor can relate to the context (i.e., what quadrant was the device previously operating in). For example, there may exist reasons to set different acceptable time periods of discrepancies based on whether the device moves into the upper right quadrant from the upper left quadrant or from the lower right quadrant. If the device moves to the lower right quadrant from the upper right quadrant (i.e., it starts from the state where it is OFF and it should be OFF, and moves to the state where it is OFF but should be on), the period of time of acceptable discrepancy might be longer than if the device moves to the same quadrant from the upper left quadrant. The latter occurrence might more likely indicate a failure, whereas the former might more likely indicate normal sensor variations.

Figure 8:
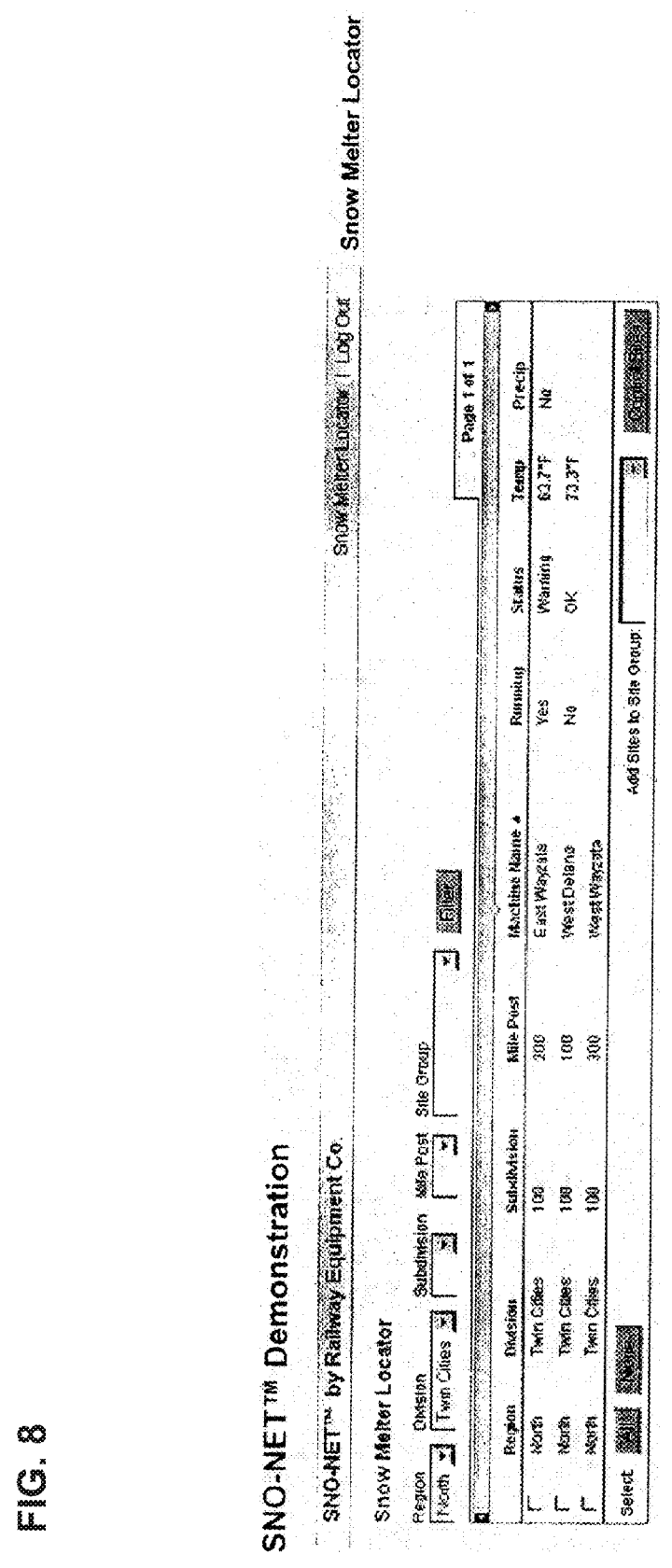

Referring to FIGS. 8-13, a specific embodiment of an internet based system is described in greater detail below. FIG. 8 is a screen shot showing a summary of the operating condition of snow melters under the control of a particular user. In the depicted embodiment, the summary of the snow melters can be organized by the user according to region, division, sub-division, mile post, or site group. In the depicted screen shot the designated region is North and the designated division is Twin Cities. Three snow melters fall within this category (i.e., East Wayzata, West Delano, and West Wayzata). The subdivision, mile post, and temperature for each of the three melters are displayed. In addition, the status and whether the melters are running are also displayed. From this screen the user can select any one of the three snow melters for further analysis.

FIG. 9 is a screen shot that corresponds with the East Wayzata snow melter shown in FIG. 8. In addition to the summary information regarding the snow melter, detailed information relating to the control and operation parameters are displayed. In the depicted screen shot, East Wayzata is not running due to the air temperature, as shown under the machine status column. Other status options include Idle, Running-OK, Not Running-Faulted, Not Running-Timed Out, Not Running-Should Be-Weather, Running-Should Not Be-Weather, and Communication Failure. In the depicted embodiment, action is called (not running due to air temperature) for by the Weather Watcher system, which is driven by the secondary source data. In the depicted embodiment the secondary source data can be used as a check on the local sensors and controls on the snow melter, or it can be used to drive the system. If the local controls and sensors are used to drive the action of the system, the secondary weather data is used as a check and issues alerts when a discrepancy is detected.

Still referring to FIG. 9, from this view the user can view an array of current status data that includes: fuel tank level, temperature set points, run time data, air temperature, rail temperature, motor voltage, duct pressure, gas pressure, total gas used, motor current, etc. Also, a link is provided to view a snapshot of the site to enable the operator to view the site. The fuel tank level is used to determine if the tank needs to be refilled, and also to calculate whether the tank is operational based on the temperature and other factors. The motor voltage and current are used to determine if the snow melter motor is operational, and also if the motor is running optimally or likely to fail. The duct pressure and gas pressure are used to troubleshoot, and also used to determine if the tank is expected to be operational. In addition, from this view the user clicks on tabs to further investigate the last fault reading, the operational history, and other control settings.

Figure 10:
FIG. 10 is a screen shot that displays the control modes and on/off parameters of a selected snow melter according to an embodiment of the invention.

FIG. 10 is a screen shot that corresponds with the Controls tab of FIG. 9. From this view the user can remotely operate the snow melter. The user can turn on or off the snow melter, adjust the temperature set points, and adjust the run times. In the depicted view the snow melter is configured to turn on continually when the air temperature is less than one degree Fahrenheit. The air temperature set point can also be used to prevent the snow melter from turning on. For example, the system can be configured such that if a sensed temperature is above a certain level, the device does not turn on.

Figure 11:
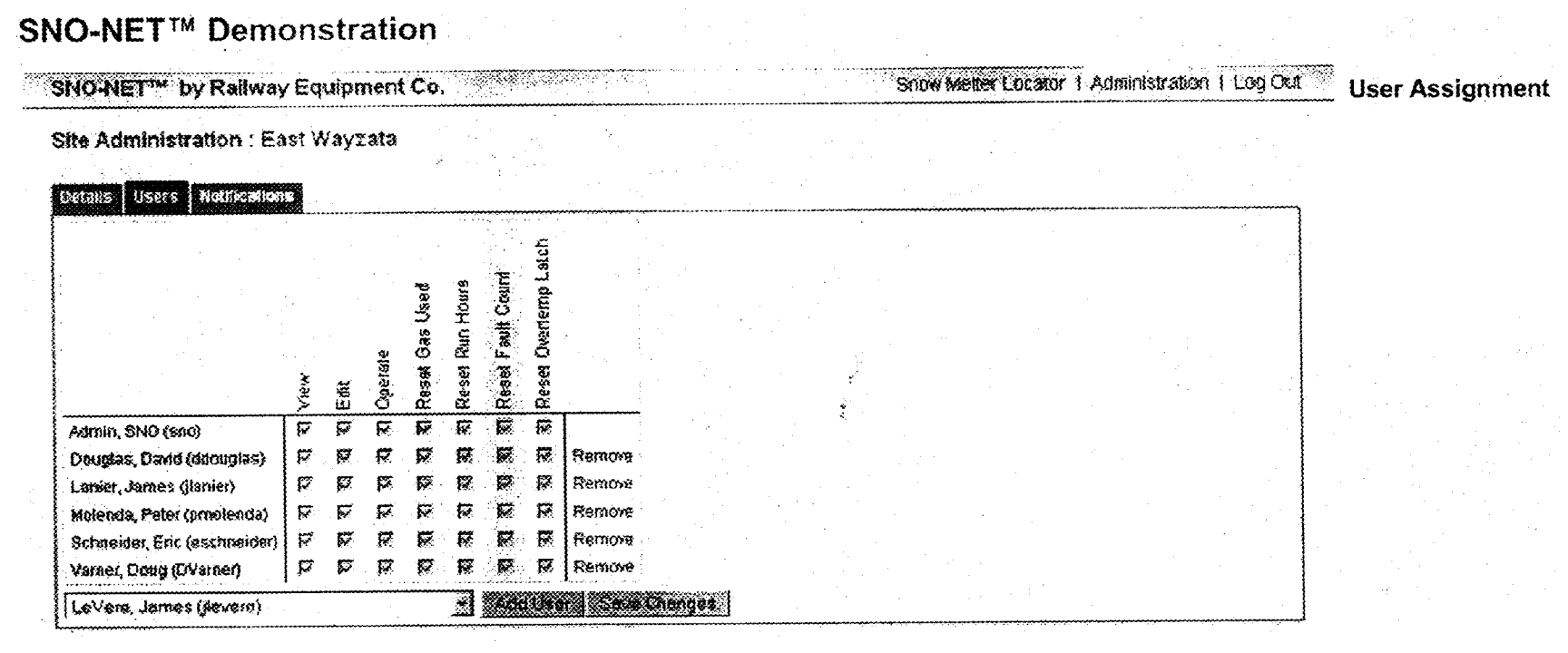

Referring to FIG. 11, a screen shot of the user assignment page is shown. The user assignment function allows for different levels of access rights to be assigned to different operators. Some operators can be authorized only to view the system, and others can be authorized to edit and modify the system. Moreover, those who are authorized to edit and modify the system may be authorized to edit and modify specific aspects of the system (e.g., gas, run hours, fault counts, and overtemp latch). In the depicted embodiment, all of the operators have full authorization to the system.

Figure 12:
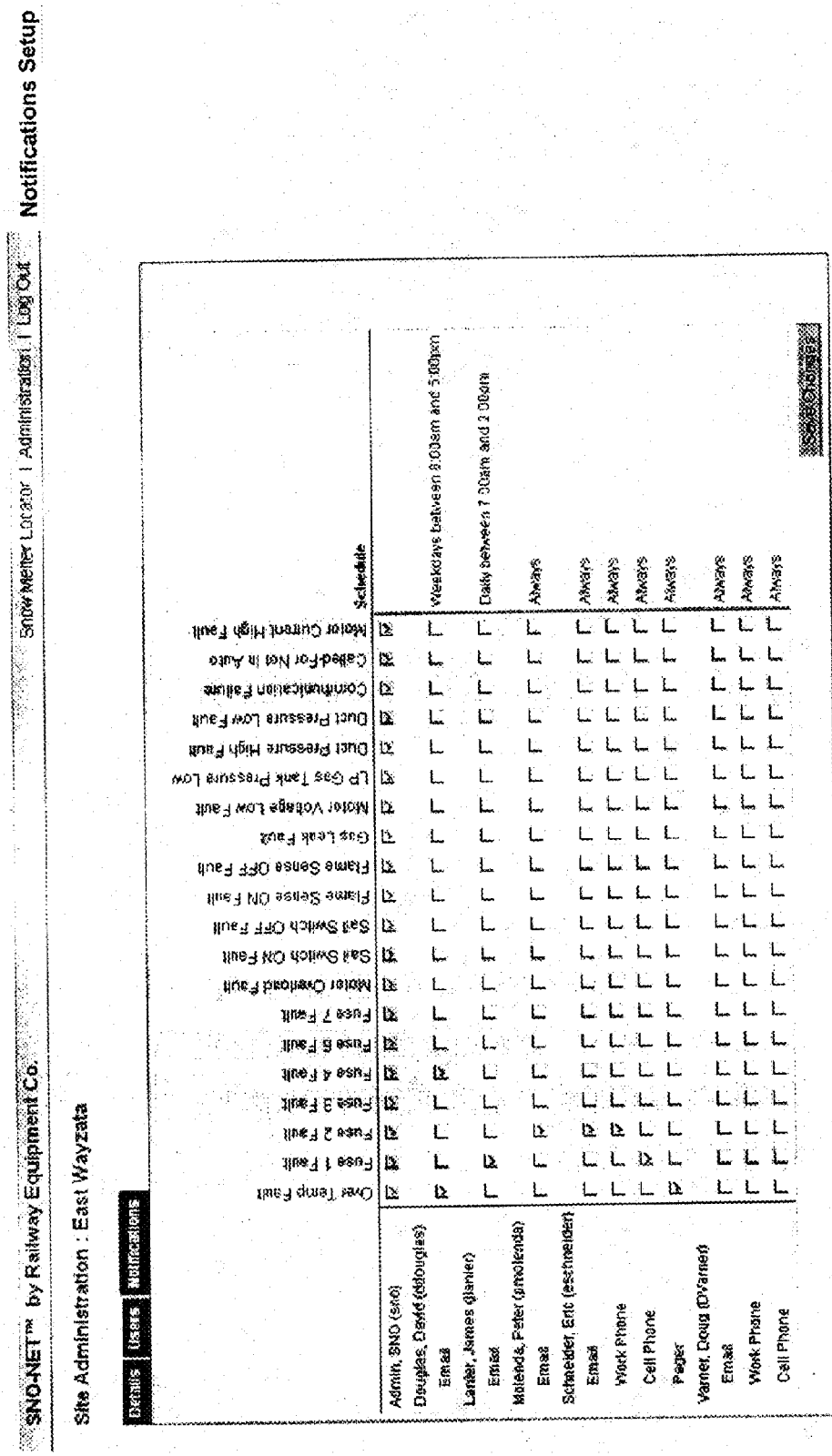
FIG. 12 is a screen shot that displays fault notifications of snow melters according to an embodiment of the invention.

Referring to FIG. 12, a screen shot of the notification setup is shown. The notification function allows for selective notification. Particular types of notification can be sent to particular users via particular means. For example, in the depicted embodiment, Peter Molenda is set to receive notification of fuse 2 faults by email only, whereas Eric Schneider is set to receive fuse 1 faults via cell phone, temperature faults via pager, and fuse 2 faults via email and work phone. In the depicted embodiment, the system administrator is set to receive notification of all of the faults. This system enables the messages to be sent to the person who is responsible for or best suited to dealing with the particular issue. FIG. 13, as discussed above, is used to log in the identifying information of each of the snow melters.

Figure 14:
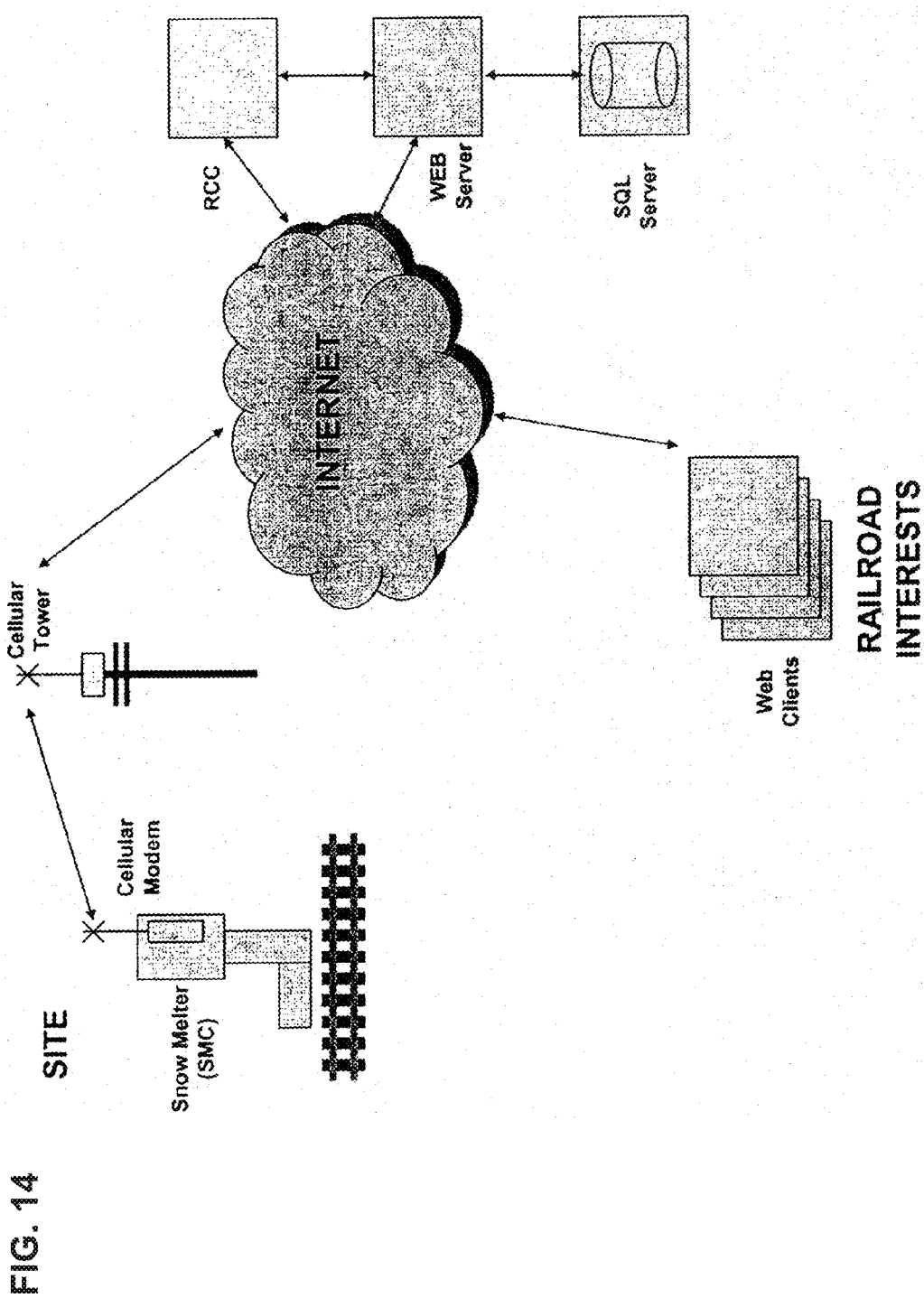
FIG. 14 is a schematic diagram of an embodiment of the network according to the present disclosure.
Figure 15:
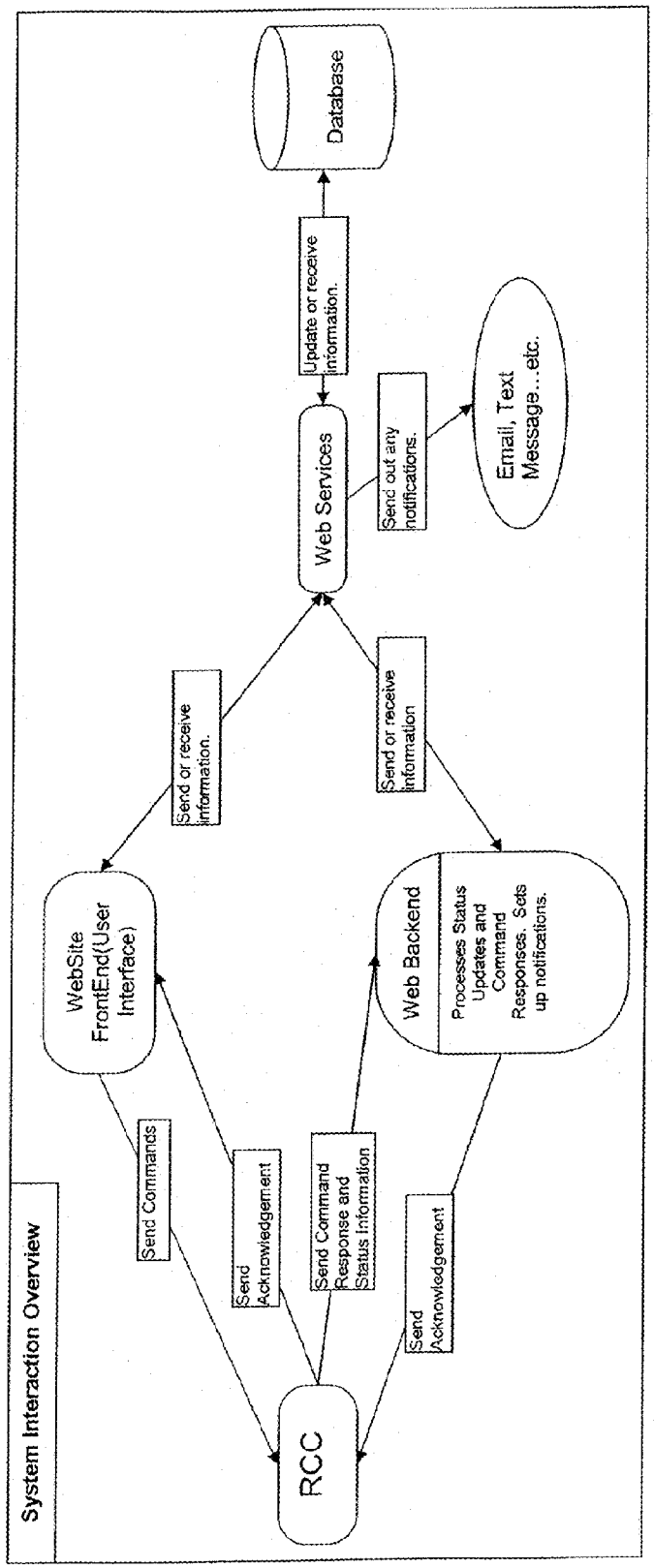
FIG. 15 is a schematic diagram of the embodiment of the network shown if FIG. 14.

Referring to FIGS. 14 and 15, a general overview of a particular embodiment of a network according to the present disclosure is included below. The components of the network architecture include: SMC—Snow Melter Controller; RCC—Remote Communications Controller; WEB—Web services and portal hosting; SQL—SQL Server database; RR—Railroad client accessing web portals.

The general messaging flow scenarios are summarized below in outline form:

1. SMC initiated

SMC ⇔RCC

SMC detects a change of operating state (i.e. from off to running) and initiates a conversation with the RCC.

SMC sends a message to the RCC containing the current snow melter operating and configuration parameters.
RCC accepts and acknowledges the message from the SMC.
SMC closes the conversation with the RCC after 1 minute of idle time.
RCC captures the parameter values from the message.
RCC ⇔WEB
RCC initiates a conversation with the WEB.
RCC sends the current snow melter parameters to the WEB.
WEB acknowledges the message from the RCC.
RCC closes the conversation with the WEB immediately.
WEB captures the parameter values from the message.
WEB updates the SQL database with the snow melter parameter values.
WEB ⇔USER
WEB analyzes the snow melter change of state to determine notification requirements.
WEB issues notification messages to railroad clients for new snow melter conditions.
2. RCC initiated
RCC ⇔SMC
RCC initiates a conversation with the SMC.
RCC sends a message to the SMC containing the command number.
SMC accepts and acknowledges the message from the RCC. Included in the acknowledgement are all SMC parameter values.
RCC closes the conversation with the SMC after 1 minute of idle time.
RCC captures the parameter values from the message.
RCC ⇔WEB
RCC initiates a conversation with the WEB.
RCC sends the current snow melter parameters to the WEB.
WEB acknowledges the message from the RCC.
RCC closes the conversation with the WEB immediately.
WEB captures the parameter values from the message.
WEB updates the SQL database with the snow melter parameter values.
WEB ⇔USER
WEB analyzes the snow melter change of state to determine notification requirements.
WEB issues notification messages to railroad clients for new snow melter conditions.
3. WEB initiated
WEB ⇔RCC
WEB user presses the "Refresh Values" button on a web page.
WEB initiates a conversation with the RCC.
WEB sends a message to the RCC containing the command number.
RCC accepts and acknowledges the message from the WEB.
RCC ⇔SMC
RCC initiates a conversation with the SMC.
RCC sends a message to the SMC containing the command number.
SMC accepts and acknowledges the message from the RCC. Included in the acknowledgement are all SMC parameter values.
RCC closes the conversation with the SMC after 1 minute of idle time.
RCC captures the parameter values from the message.
RCC ⇔WEB
RCC initiates a conversation with the WEB.
RCC sends the current snow melter parameters to the WEB.
WEB acknowledges the message from the RCC.
RCC closes the conversation with the WEB immediately.
WEB captures the parameter values from the message.
WEB updates the SQL database with the snow melter parameter values.
WEB ⇔USER
WEB analyzes the snow melter change of state to determine notification requirements.
WEB issues notification messages to railroad clients for new snow melter conditions.

From the foregoing detailed description, it will be evident that modifications and variations can be made in the devices and methods of the disclosure without departing from the spirit and scope of the invention.

We claim:

1. A railroad snow removal network comprising:
a plurality of snow removal devices positioned at geographic locations each including a snow removal element, a sensor for detecting snow fall, a transmitter, and a processor, wherein each snow removal device is configured to automatically turn on when snow fall is detected;
a computing device including a processor, a transmitter, and a receiver, the computing device configured to acquire weather data from a weather reporting source wherein the data corresponds to the geographic locations of the snow removal devices, wherein the computing device is configured to send an alert when a snow removal device is turned off when the weather reporting source indicates that snow is falling at the corresponding location; and
a user interface configured to display at least the location of the snow removal device.

2. The snow removal network according to claim 1, wherein the snow removal element comprises a heating unit and a blower.

3. The snow removal network according to claim 1, wherein the sensor includes a moisture sensor and a temperature sensor.

4. The snow removal network according to claim 1, wherein the user interface includes a handheld or desktop computer operably connected to the snow removal device.

5. The snow removal network according to claim 1, wherein the computing device is configured to send specific types of alerts to specific operators.

6. The snow removal network according to claim 1, wherein the computing device is configured such that the alert is sent after a predetermined amount of time passes.

7. The snow removal network according to claim 1, wherein the computing device is configured to turn on and turn off the snow removal devices.

8. The snow removal network according to claim 1, wherein the computing device is configured to automatically turn on the snow removal devices when the weather reporting source indicates that snow is falling, and turn off the snow removal device when the snow is not falling.

9. The snow removal network according to claim 1, configured to store historical data relating to the operation of the snow removal devices.

10. A railroad snow removal monitoring network comprising:
a snow removal device including a heating element, a sensor, and a transmitter; and
a computing device including a processor, a transmitter, and a receiver, the computing device configured to receive data collected from the sensor and compare the received data with data from a secondary data source and send an alert to an operator based on the comparison.

11. The network according to claim 10, wherein the sensor is configured to sense snow fall.

12. The network according to claim 10, wherein the sensor includes a temperature sensor and a moisture sensor.

13. The network according to claim 10, wherein the secondary source is a weather reporting service.

14. The network according to claim 10, wherein the computing device sends an alert by email to an operator.

15. The network according to claim 14, further comprising a user interface that displays data sensed by the sensor, displays whether the heating element is on or off, displays the data from the secondary source, and is configured to enable an operator to turn on or off the heating element remotely.

16. The network according to claim 10, wherein the sensor is configured to sense whether the heating element is on or off.

17. A method of monitoring a plurality of railroad switch snow removal devices, the method comprising:
    measuring at least a temperature at a location of a snow removal device to determine if snow is falling at the location;
    querying data from a secondary source of weather information for information relating to whether snow is falling at the location;
    determining if there is a discrepancy regarding whether snow is falling at the location; and
    automatically alerting an operator if a discrepancy is detected.

18. The method according to claim 17, wherein the snow removal device is configured to turn on or off automatically depending on the data queried from the secondary source.

19. The method of claim 17, further comprising measuring fuel consumed by the snow removal device and the fuel level in the fuel tank.

20. The method of claim 17, further comprising measuring duct pressure and tank pressure in the fuel tank.

21. A railroad snow removal monitoring network comprising:
    a snow removal device including a heating element, a sensor, and a transmitter; and
    a computing device including a processor, a transmitter, and a receiver, the computing device configured to receive data collected from the sensor and compare the received data with data from a secondary data source.

22. A railroad snow removal network comprising:
    a plurality of snow removal devices positioned at geographic locations, wherein each snow removal device is configured to automatically turn on when snow fall is detected;
    a computing device configured to acquire weather data from a weather reporting source wherein the data corresponds to the geographic locations of the snow removal devices, wherein the computing device is configured to send an alert when a snow removal device is turned off when the weather reporting source indicates that snow is falling at the corresponding location and send an alert when the snow removal device is turn on when the whether reporting source indicates that snow is not falling at the corresponding location.

23. A method of monitoring a plurality of railroad switch snow removal devices, the method comprising:
    monitoring whether a snow removal device is on or off;
    querying data from a weather reporting source and determining whether the snow removal device should be on or off,
    determining if there is a discrepancy regarding whether the snow removal device is on or off; and
    automatically alerting an operator if a discrepancy is detected.

24. A method of using an automated system to monitor a railroad switch snow removal device located at a geographic region, the method comprising:
    monitoring the snow removal device with the automated system to determine an actual operational status of the snow removal device, the actual operational status being either on or off
    monitoring weather data for the geographic region from a weather information service, the weather data for the geographic region being monitored by the automated system;
    using the automated system to determining a recommended operational status of the snow removal device based on the weather data monitored from the weather information service, the recommended operational status being either on or off;
    using the automated system to detect if there is a discrepancy between the actual operational status and the recommended operational status of the snow melter; and
    using the automated system to automatically alert an operator if a discrepancy is detected between the actual operational status and the recommended operational status of the snow melter.

* * * * *